March 19, 1935. A. LACK ET AL 1,994,858
SEAL FOR ROTARY ENGINES AND THE LIKE
Filed July 29, 1932 2 Sheets-Sheet 1
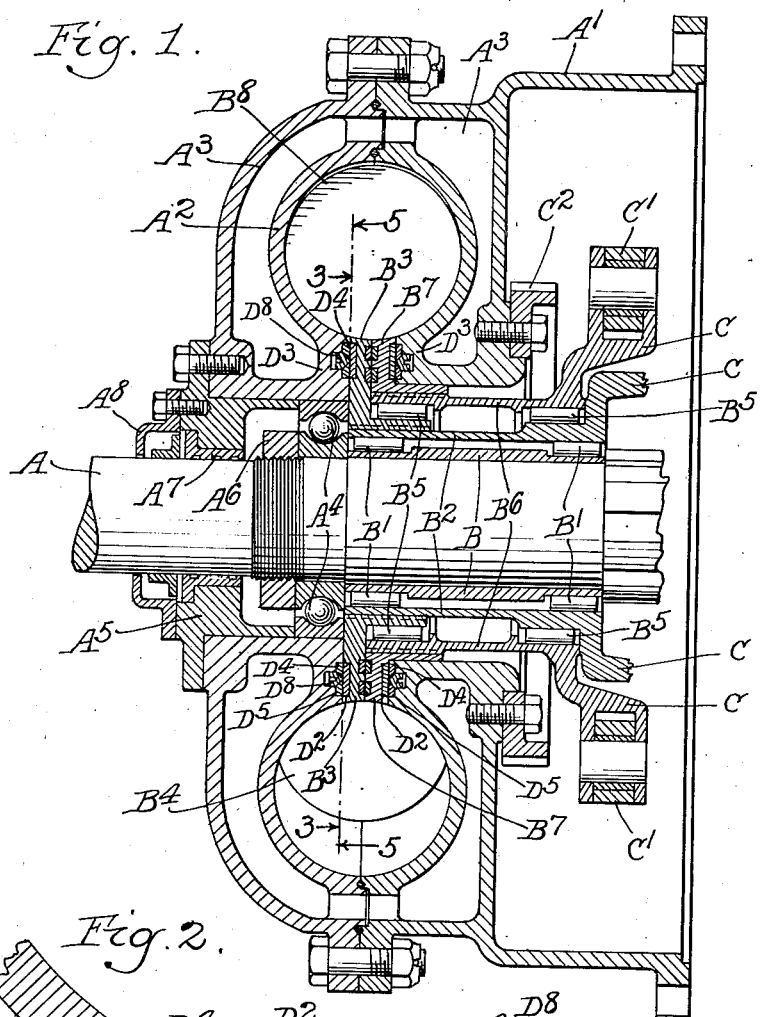
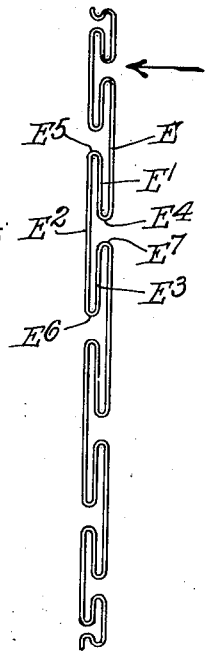
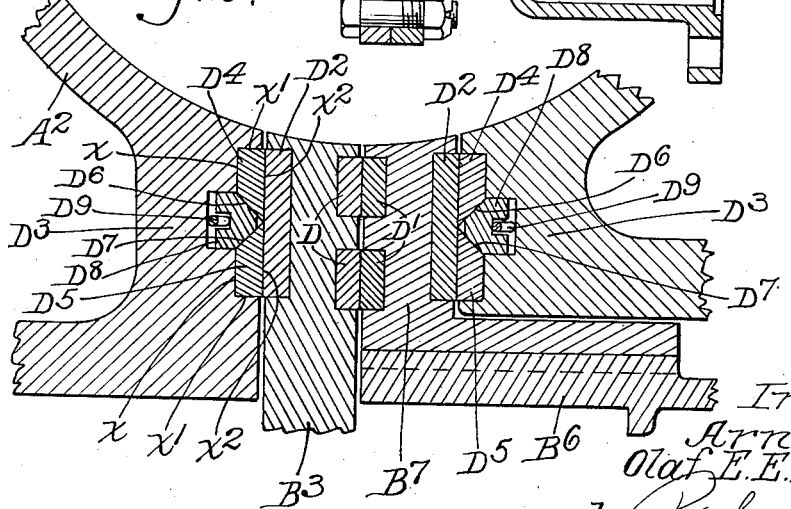
Inventors
Arnold Lack
Olaf E. E. Stromberg
by Parker & Carter
Attorneys.

March 19, 1935.　　A. LACK ET AL　　1,994,858
SEAL FOR ROTARY ENGINES AND THE LIKE
Filed July 29, 1932　　2 Sheets-Sheet 2

Inventors
Arnold Lack
Olaf E. E. Stromberg
by Parker & Carter
Attorneys.

Patented Mar. 19, 1935

1,994,858

UNITED STATES PATENT OFFICE 1,994,858

SEAL FOR ROTARY ENGINES AND THE LIKE

Arnold Lack, Wilmette, and Olaf E. E. Stromberg, Chicago, Ill., said Lack assignor to said Stromberg Application July 29, 1932, Serial No. 625,876

6 Claims. (Cl. 286—7)

Our invention relates to improvements in seals for rotary engines and the like and has for one object to provide a new and improved form of seal ring and seal ring holding and supporting mechanism especially adapted to use in rotary piston engines wherein the piston rotates about a central axis in a torus cylinder.

One object of the invention is to provide a seal which will resist the combustion pressure in the engine with a minimum of compression loss from the cylinder, with a minimum of oil leakage into the cylinder, with a minimum of friction. Another object is to provide a ring which will be independent of temperature variations in its operation. Other objects will appear from time to time throughout the specification and claims.

Our invention is illustrated more or less diagrammatically in the accompanying drawings, wherein—

Figure 1 is a section through an engine with which our seal is used;

Figure 2 is a detail section on an enlarged scale on the same plane as the section of Figure 1;

Figure 10 is a section through a modified form of spring ring.

Like parts are indicated by like characters throughout the specification and drawings.

Figure 3:
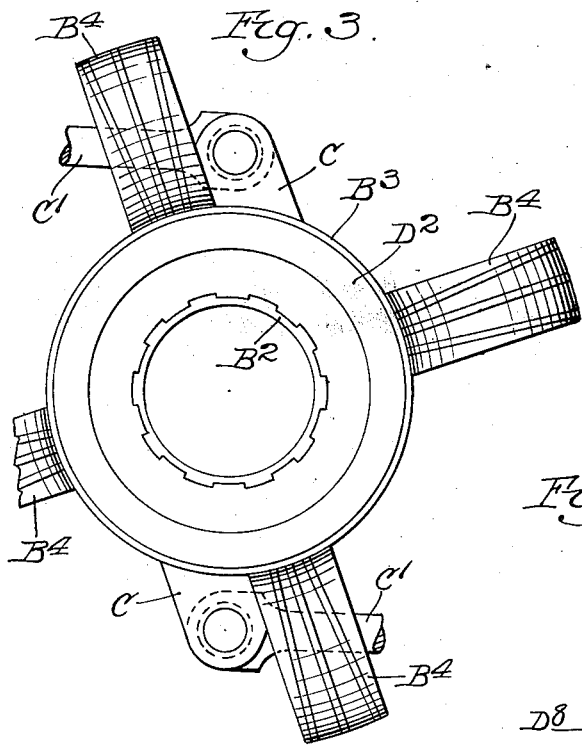
Figure 3 is a section along the line 3—3 of Figure 1.
Figure 4:
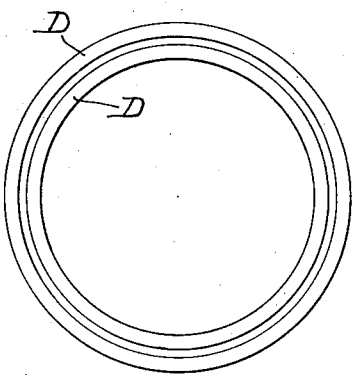
Figure 4 is a side elevation of the two center rings on opposed faces of the carriers.
Figures 6, 7:
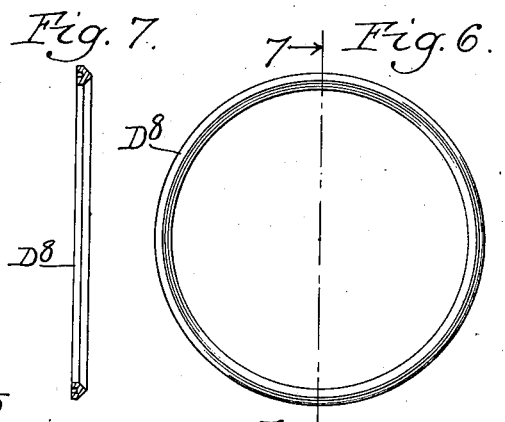
Figure 6 is a side elevation and Figure 7 is a section through the wedging ring.
Figure 5:
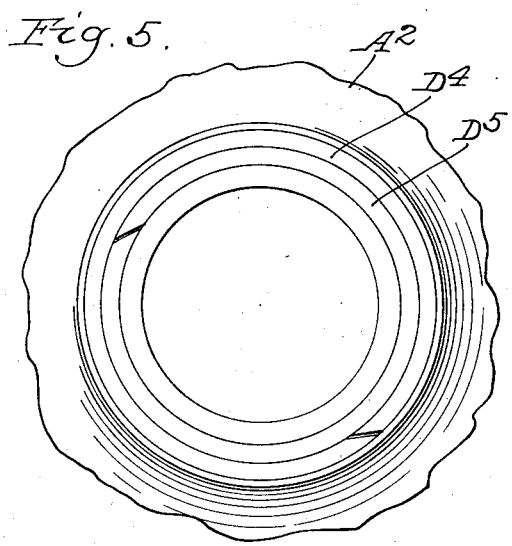
Figure 5 is a section along the line 5—5 of Figure 1.

Our invention has been illustrated in its application to a rotary piston engine. Obviously some or all of the elements set out in connection with the seal ring and the means for mounting and supporting the seal ring might be used under other circumstances and we want it understood that the application we have shown is illustrative only.

A is a central engine shaft. $A^1$ is a gear housing. Mounted on the gear housing and encircling the shaft is a cylindrical torus $A^2$ surrounded by a water jacket $A^3$. The water jacket and cylinder in effect forms part of the housing assembly. $A^4$ is an anti-friction bearing interposed between the shaft and the inner periphery of the water jacket and housing. $A^5$ is a filler hub encircling the shaft and holding the outer race of the ball bearing in place in the housing. $A^6$ is a nut threaded on the shaft and holding the inner race in position thereon. $A^7$ is an oil packing ring and $A^8$ a grease or oil labyrinth housing to protect the bearing $A^4$.

B is a sleeve fixed on the shaft. At each end it is engaged by rollers $B^1$ which support the sleeve $B^2$. This sleeve is flanged at one end as at $B^3$ and forms a piston carrier upon which are mounted four of the pistons $B^4$. $B^5$ are roller bearings encircling the sleeve $B^2$ and supporting the sleeve $B^6$ which is flanged at one end as at $B^7$ adjacent the flange $B^3$ and carries a group of pistons similar to the group of pistons $B^4$.

At the opposed ends, the sleeves $B^2$ and $B^6$ are crank arms C on which are pivoted connecting rods $C^1$. The details of the connecting rods and their connections to the remaining mechanisms are not shown as they form no part of my present invention. $C^2$ is a gear radially mounted on the interior of the housing $A^1$ for use in connection with the operation of the machine, the details cooperating with it not being shown. It will be noted that the two flanges $B^3$ and $B^7$ are parallel and side by side and together fill or close the annular slot in the inner periphery of the torus so that the eight pistons all operate in a closed cylinder and it will be understood that power is developed in the cylinder by the combustion of hydrocarbon or other gases, burning of oil or steam under pressure. There is therefore always during operation, pressure generated in the cylinder which tends to leak out between the housing walls and the piston carriers and of course there is also a tendency of oil from the housing to leak into the cylinder when the pressure is low as it periodically is during the cycle of operation in an internal combustion or steam engine.

D $D^1$ are packing rings arranged in opposed pairs in the opposed faces of the piston carrier flanges $B^3$ and $B^7$. For strength the piston carrier flanges will preferably be of steel or some similar material and will have annular grooves cut in their opposed faces in which are seated the packing rings D $D^1$ which will preferably be of cast iron and which will project from the faces in such a way that as shown in Figure 2, the two pairs of rings are mated but the opposed surfaces of the piston carrier flanges are out of contact.

In the outer faces respectively of the flanges $B^3$ $B^7$ are relatively wide grooves in which are mounted the outside packing rings $D^2$. These outside packing rings as are the rings D $D^1$ are fixed in position in and rotate with the piston carriers though they may if desired be split and have their mating ends chamfered to permit expansion and contraction under load and under temperature variations.

Figures 8, 9:
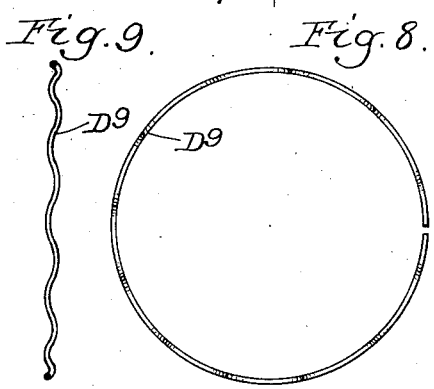
Figure 8 is a plan view of the spring ring.
Figure 9 is a section through the spring ring.

In each of the opposed faces of the housing as at $D^3$ which bind the peripheral slot which communicates with the interior of the cylinder are further recesses, which recesses carry the two packing rings $D^4$ $D^5$ in opposition to the rings $D^2$. These packing rings have opposed edge walls $D^6$ $D^7$ tapered or chamfered as indicated and the two opposed chamfered walls are engaged by a single wedge ring $D^8$ having tapered surfaces to engage the chamfered surfaces $D^6$ $D^7$. The spring ring $D^9$ exerts a pressure on the wedge ring to force each of them toward the piston carrier flanges. This pressure causes them to wedge the rings $D^4$ $D^5$ against the rings $D^2$ and also to wedge the rings $D^4$ and $D^5$ away from one another so that there is a packing pressure applied to the surfaces $x$, $x^1$ and $x^2$. Also this spring pressure tends to force the two rings $D$ $D^1$ together. It will be noted that in Figures 8 and 9, we have shown the spring ring, a ring laterally deformed. The spring ring in Figure 10 is a different type of ring. It differs from the ring of Figures 8 and 9 in that lateral pressure on the ring in Figure 8 tends to elongate the ring and by causing change in the length of the ring causes movement of the ring throughout its entire length, which movement is resisted by friction, making a sluggishly operating ring which under some circumstances is desirable, the friction throughout the whole length causing a damping effect to prevent vibration. Under other circumstances, however, it is sometimes desirable to have a more sensitive undamped spring. The spring of Figure 10 accomplishes this because here the spring comprises lateral straight sections $E$ $E^1$ $E^2$ $E^3$, each adjacent section being joined by a curved portion $E^4$ $E^5$ $E^6$ $E^7$. The sections $E$ $E^2$ are free to move toward and from one another in the direction of the arrow shown in Figure 10 causing bending only at $E^4$ $E^5$ $E^6$ and $E^7$ and not causing any change in the overall length of the spring ring.

It will of course be understood that it is necessary that the rubbing area between the rings be as small as possible in order to reach a high specific pressure with a low spring load and that the spring load must be very small in order to reduce friction. The specific pressure must be high so as to satisfactorily seal against a high gas pressure in the cylinder. It will also be understood that all of the rings must be split except the wedge ring in order to permit expansion and contraction subject to variation in temperature without dangerous effect and without binding or cramping or breaking of the rings and to avoid interference with ring operation.

We claim:

1. Packing means for two relatively rotatable annular members comprising a plurality of packing rings projecting slightly beyond the opposed faces thereof and in contact with one another along planes generally parallel with the planes of the opposed faces, one of the rings being fixed in its member, the other being loosely supported, yielding means for pressing the loose ring against the fixed ring, and for displacing it along radial lines to provide a sealing seating on the member in which it is supported, said means comprising a wedge ring concentric with the loose packing ring, the rings having opposed surfaces inclined to the plane of contact between the packing rings and means for yieldingly pressing the wedge ring toward the packing ring, said means comprising a spring extending throughout substantially the entire periphery of the wedge ring, the spring comprising an elongated flexible member recurved upon itself to form a plurality of parallel opposed engaging members with intermediate curved members joined by short pressure transmitting elements.

2. Packing means for two relatively rotatable annular members comprising a plurality of packing rings projecting slightly beyond the opposed faces thereof and in contact with one another along planes generally parallel with the planes of the opposed faces, one of the rings being fixed in its member, the others being loosely supported and yielding means for pressing the loose rings against the fixed ring, and for displacing them in opposite directions along radial lines to make a packing contact between them and the member in which they are supported, said means comprising a wedge ring concentric with the loose packing ring, the rings having opposed cam surfaces inclined to the plane of contact between the packing rings and means for yieldingly pressing the wedge ring toward the packing ring, said means comprising a spring extending throughout substantially the entire periphery of the wedge ring, the spring comprising an elongated flexible member recurved upon itself to form a plurality of parallel opposed engaging members with intermediate curved members joined by short pressure transmitting elements.

3. Packing means comprising two concentric spilt packing rings located in a plane perpendicular to their central axis, the opposed edges of said rings being inclined away from one another, a wedge ring associated with them having opposed surfaces one in engagement with the inclined face of each of the packing rings, a member in which said rings are socketed having annular walls adapted to be engaged by the outer periphery of the outer ring and the inner periphery of the inner ring, the back of the wedge ring removed from its inclined faces being annularly slotted and spring means contained within said annular slot adapted to force the wedge ring into engagement with the packing rings to spread them apart and to press them in a direction parallel with their central axis.

4. Packing means comprising two concentric split packing rings located in a plane perpedicular to their central axis, the opposed edges of said rings being inclined away from one another, a wedge ring associated with them having opposed surfaces one in engagement with the inclined face of each of the packing rings, a member in which said rings are socketed having annular walls adapted to be engaged by the outer periphery of the outer ring and the inner periphery of the inner ring, the back of the wedge ring removed from its inclined faces being annularly slotted and spring means contained within said annular slot adapted to force the wedge ring into engagement with the packing rings to spread them apart and to press them in a direction parallel with their central axis.

5. A packing including a movable member having a flat annularly channelled working face, two concentric split packing rings located in the channel, the opposed walls of said rings being inclined away from one another, a wedge ring concentric with the packing rings and having opposed inclined surfaces engaging the opposed inclined walls of the packing rings, the back of the wedge ring being annularly grooved, a labyrinth spring contained within the groove adapted to force the wedge ring against the packing rings whereby they are urged respectively inwardly and outwardly against side walls of the channel and forwardly in a plane perpendicular to the working face.

6. Packing means for opposed moving surfaces including a bearing surface on one member and a groove in the other, a pair of concentric packing rings in said grooves, one adjacent the inner, the other adjacent the outer periphery of the groove, said rings in engagement with the wearing surface on the other member, the opposed faces of the two packing rings being chamfered, a wedge ring in engagement with the chamfered faces on the packing rings, the slot being deepened rearwardly behind the packing rings to provide place for the wedge ring, there being a slot in the wedge ring in line with the central portion thereof between the inclined faces and a spring contained within said slot extending throughout substantially the entire periphery of the wedge ring and compressed between the ring and the groove in which the wedge ring is mounted.

ARNOLD LACK.
OLAF E. E. STROMBERG.